United States Patent [19]

Rittschof et al.

[11] Patent Number: 4,704,286

[45] Date of Patent: Nov. 3, 1987

[54] GUSTATORY ADDITIVE FOR FISHING LURES

[76] Inventors: Daniel Rittschof, 1305 Live Oak; Gaspard X. Criner, Shell Landing; Joseph Bonaventura, 127 Circle Dr., all of Beaufort, N.C. 28516

[21] Appl. No.: 753,252

[22] Filed: Jul. 9, 1985

[51] Int. Cl.$^4$ ................................................ A23K 1/18
[52] U.S. Cl. .......................................... 426/1; 426/805
[58] Field of Search ................... 426/1, 805; 43/44.99; 252/11

[56] References Cited

U.S. PATENT DOCUMENTS

| | | | |
|---|---|---|---|
| 2,452,552 | 11/1948 | Curtis et al. | 426/1 |
| 2,631,937 | 3/1953 | Buss | 426/1 |
| 2,874,048 | 2/1959 | Walldov | 426/1 |
| 3,410,689 | 11/1968 | Nathan | 426/1 |
| 3,889,007 | 6/1975 | Gunter et al. | 426/805 |
| 4,413,014 | 11/1983 | Melancon | 426/1 |
| 4,463,018 | 7/1984 | Carr | 426/1 |

FOREIGN PATENT DOCUMENTS

| | | | |
|---|---|---|---|
| 53-127197 | 11/1978 | Japan | 426/1 |
| 59-118050 | 7/1984 | Japan | 426/1 |

*Primary Examiner*—George Yeung
*Attorney, Agent, or Firm*—Jones, Askew & Lunsford

[57] ABSTRACT

The gustatory additive of the present invention provides an improved fish bait. The gustatory additive causes a fish to hold a lure treated with the gustatory additive in its mouth for a longer period of time or causes the fish to swallow the lure. Because the fish holds the lure coated with the gustatory additive in its mouth for a relatively longer period of time, the fisherman has more time in which to set the hook in the fish's mouth.

The gustatory additive of the present invention is comprised of a mixture of nutrients that are mixed with a water insoluble matrix and then applied to the surface of a lure. The gustatory additive of the present invention can also be distributed throughout the lure.

10 Claims, 8 Drawing Figures

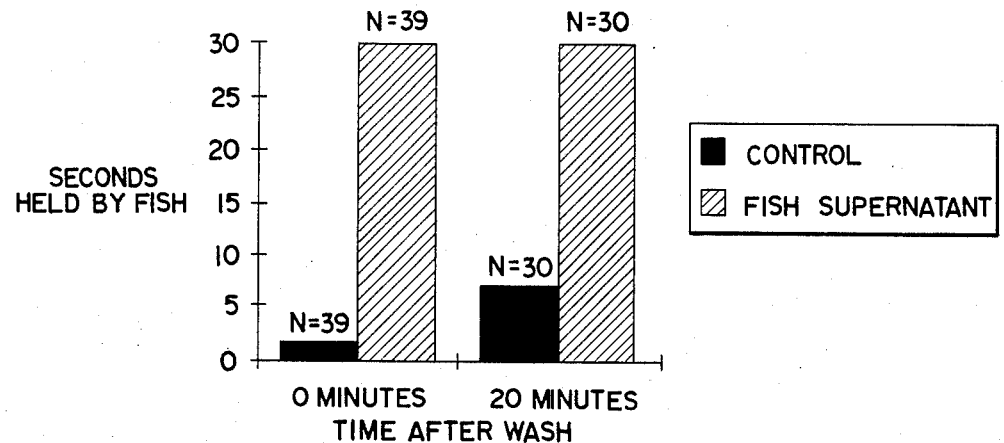
Fig_1
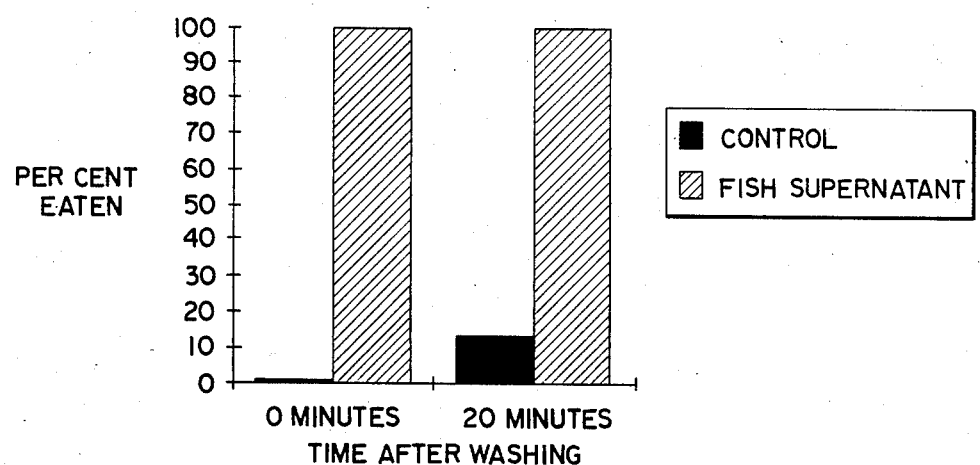
Fig_2

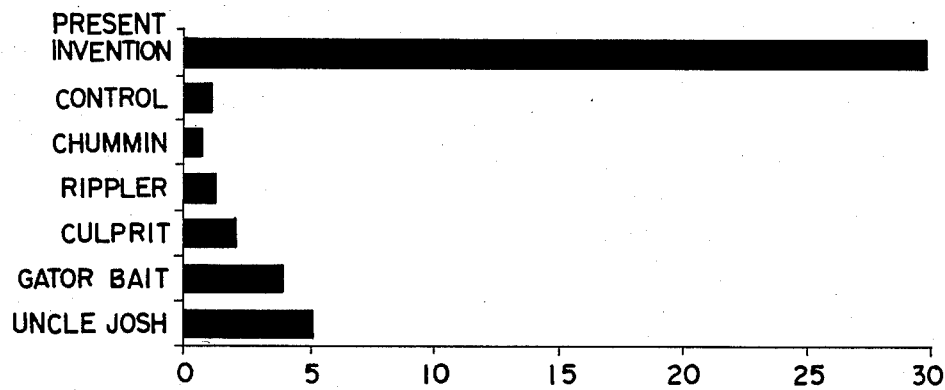
Fig_7
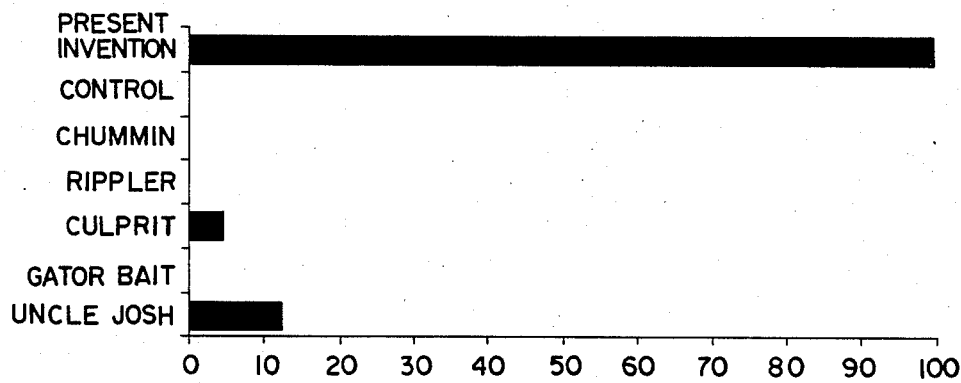
Fig_8

GUSTATORY ADDITIVE FOR FISHING LURES

TECHNICAL FIELD

The present invention relates to a gustatory additive for fishing lures and more particularly to an additive that can be applied to the surface of a fishing lure or incorporated into the fishing lure and thereby cause fish to hold the lure in its mouth for a relatively longer period of time than untreated lures.

BACKGROUND OF THE INVENTION

Prior art research in the area of fishing aids has centered on developing formulations that will attract a fish to a certain area or increase the general feeding response of the fish.

Chemical fishing aids that have been described in the prior art have, in general, been designed to attract fish to the vicinity where a fisherman has placed his lure. This is done by either incorporating the chemical agent directly into the lure or by releasing the agent into the water in the vicinity of the lure. The chemical attracting agent will diffuse through the water from the point of release and set up a chemical gradient, i.e., the chemical attracting agent will have the highest concentration at the point of release and the concentration of the gradient in the water will decrease proportionately with distance from the point of release. Thus, when a fish senses the presence of the chemical attractant, the fish will swim toward the lure where the chemical attractant is present at the highest concentration.

Examples of such fishing aids include U.S. Pat. No. 1,393,617 which discloses the inclusion of a fish oil soaked cotton swab in an artifical structure containing a hole through which the fish oil escapes upon immersion in water. U.S. Pat. No. 2,826,853, describes an artifical fish lure which contains a strip of chamois soaked with a fish attracting liquid such as anise, fish oil, etc.

U.S. Pat. No. 3,672,910 discloses the use of a mixture of whole animal blood and a gelling agent as a fish bait. The mixture is allowed to solidify and is dried before using as a fish bait.

U.S. Pat. No. 4,053,640 discloses a fish attractant that comprises raw fish which is ground and pulverized in micronized form and is then blended with a surface active agent to facilitate the dispersion of the attractant in water. The attractant is then dried and placed in a bag. For use, the attractant is immersed in water where it is rehydrated and dispersed.

Another type of chemical fishing aid is a chemical that non-specifically stimulates the feeding response of fish. This type of fishing aid is released into the water, and any fish in the vicinity of the dispersed chemical agent will be stimulated into a heightened feeding response. This type of fishing aid does not cause the fish to specifically strike a particular lure but does cause the fish to respond to food in general.

An example of a fish feeding stimulant is disclosed in U.S. Pat. No. 3,903,260. This patent discloses the use of a solution of monosodium glutamate and/or an alkali metal aspartate or a solution of lysine and/or glycine as a feeding stimulate for fish and crustacea.

Many of the prior art fish baits and fish attractants utilize odor to attract fish. An example of this type of bait is disclosed in U.S. Pat. No. 3,684,519. This patent discloses the use of comminuted organic tissue particles dispersed in a solidified polyacrylamide gel. When stored out of contact with water, the gel tightly compacts around the tissue particles and prevents biological degradation of the tissue. When immersed in water, the gel swells to allow bacterial action to take place in the tissue. The tissue odor is then released throught the surrounding gel into the surrounding water.

There are several problems with the prior art chemical fishing formulations. Those formulations that attract fish do not necessarily cause the fish to strike at the fisherman's lure. A fish may be attracted to the area of the lure and the fish's feeding behavior may be stimulated. However, this does not insure that the fish will strike at the fisherman's lure and hold the lure in its mouth along enough for the fisherman to set the hook.

In addition to developing various combinations of chemicals to attract fish and to stimulate the feeding behavior of a fish, much time and effort has been expended in developing lures that will visually attract a fish and cause the fish to engulf the lure. Attractive lures have been developed that are highly successful in causing a fish to strike at the lure. However, once the fish grasps the lure in its mouth, the fish apparently immediately recognizes that the lure is artificial, (i.e., the lure has no taste) and releases the lure from its mouth.

Finally, lures have been developed using various organic materials, such as whole blood or meat. These lures are, in general, subject to spoilage by bacteria and other microorganisms and tend to be short lived after immersion into water. In addition, many of these fishing aids are difficult to prepare and require expensive preparation techniques.

BRIEF SUMMARY OF THE INVENTION

The gustatory additive of the present invention provides an improved fish bait. The gustatory additive of the present invention solves the above problems in the prior art by causing a fish to hold a lure treated with the gustatory additive in its mouth for a longer period of time or to swallow the lure. Because the fish holds the lure coated with the gustatory additive of the present invention in its mouth for a relatively longer period of time, the fisherman has more time in which to set the hook in the fish's mouth. The gustatory additive of the present invention is comprised of a mixture of nutrients that are mixed with a water insoluble matrix. The mixture of nutrients and water insoluble matrices is then applied to a fishing lure.

In one embodiment of the gustatory additive of the present invention, a whole fish is thoroughly homogenized. The soluble portion of the homogenate is separated from particulates by low speed centrifugation. The supernatant from the centrifugation step is then lyophilized. The fluffy, red-grey powder resulting from the lyophilization step is resuspended in distilled water at a concentration between approximately 20 and 30 times higher than the original supernatant. Alternatively, lyophylized supernatant powder is mixed with a petroleum-based gel. The petroleum gel-fish homogenate mixture is then applied topically to a fishing lure.

In a second embodiment of the gustatory additive of the present invention, a commercially available nutrient formulation is mixed with a water insoluble matrix. The nutrient formulation and insoluble matrix mixture is then applied to the surface of a lure.

Thus, it is an object of the present invention to provide an improved fish bait.

It is another object of the present invention to provide a fish gustatory stimulant that can be used to coat a lure or can be incorporated into a lure, causing a fish to hold the lure in its mouth for a relatively longer period of time than untreated lures, thereby giving a fisherman an improved opportunity to set the hook in the fish's mouth.

It is yet a further object of the present invention to provide an improved artificial lure that has a gustatory additive applied to the surface of the lure.

It is another object of the present invention to provide a gustatory additive that can be applied to the surface of the lure and that will remain on the lure after immersion into water.

These and other objects, features and advantages of the present invention will become apparent after a review of the following detailed description of the disclosed embodiments and the appended claims.

BRIEF DESCRIPTION OF THE DRAWINGS

FIG. 1 is a graph comparing the time a fish holds a lure treated with one embodiment of the present invention and the time a fish holds an untreated lure.

FIG. 2 is a graph comparing the ingestion by fish of lures treated with one embodiment of the present invention and untreated lures.

FIG. 7 is a graph comparing the time a lure coated with the gustatory additive of the present invention is held by a fish to the time lures coated with extracts from commercially available fish attractants is held by fish.

FIG. 8 is a graph comparing the ingestion by fish of lures coated with the gustatory additive of the present invention to lures coated with extracts from commercially available fish attractants.

DETAILED DESCRIPTION OF THE DISCLOSED EMBODIMENT

Figure 3:
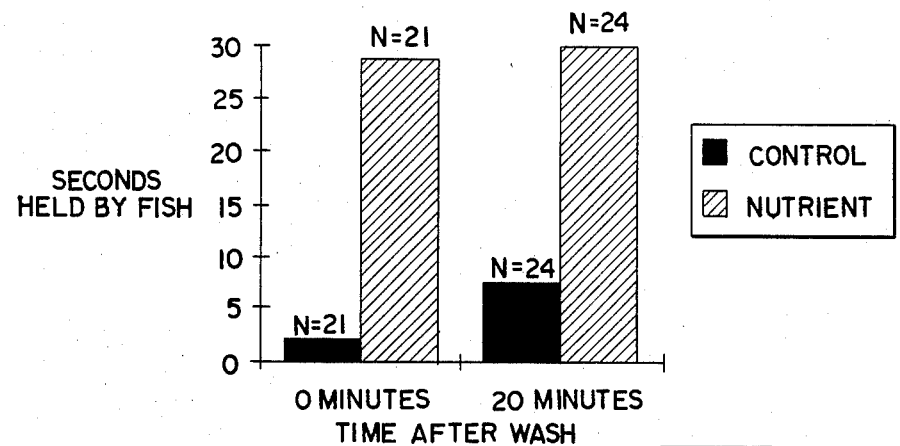
FIG. 3 is a graph comparing the time a fish holds a lure treated with a second embodiment of the present invention and the time a fish holds an untreated lure.

In accordance with the present invention, a preferred embodiment of the gustatory additive is a mixture of chemicals comprising a nutrient formulation in a water insoluble matrix. The preferred nutrient formulation is comprised of a gelatin hydrolysate made by pancreatic digestion of gelatin and an aqueous beef extract. However, it is to be understood that many nutrient formulations that contain amino acids can be used in the gustatory additive of the present invention.

In a second embodiment of the gustatory additive according to the present invention, the gustatory additive comprises a concentrated supernatant of a fish homogenate that is mixed with a water insoluble matrix.

When an artificial lure is coated with the gustatory additive of the present invention and is immersed in water with fish present, the fish will be visually attracted to the lure. The fish will then strike or bite the artificial lure with its mouth. Because the gustatory additive of the present invention has been applied to the lure, the fish tastes the gustatory additive and either holds the artificial lure in its mouth for a relatively longer period of time or attempts to swallow the lure. The fisherman therefore has more time in which to set the hook in the fish's mouth.

This is an unexpected advantage over artificial lures and chemical fishing aids of the prior art. With lures that are described in the prior art, the fish will generally spit the lure out of its mouth immediately after biting the lure. Thus, a fisherman must set the hook as the fish bites the lure with its mouth. If the fisherman waits, the fish will spit the lure out of its mouth before the hook is set.

It is to be understood that the gustatory additive of the artificial fishing lure of the present invention can either be applied topically or can be incorporated into the artificial lure.

EXAMPLE I

One embodiment of the gustatory additive of the present invention is prepared by thawing whole frozen fish for 24 hours before processing. Fish that can be used to prepare the gustatory additive, include but are not limited to, spot (*Leiostomus xanthurus*) and croaker (*Micropogon undulatus*).

The thawed fish are either homogenized in a blender with distilled water, or passed through a food mill. The homogenate from the blender or the ground fish is placed in centrifuge jars and weighed. A small volume (20 to 30 mls) of distilled water is added to the ground fish. The homogenate is then allowed to incubate at room temperature for between approximately 15 to 60 minutes. This allows the degradative enzymes that are present in the homogenate to partially break down the proteins and other constituents that make up the whole fish. The homogenate is then centrifuged at approximately 5000 revolutions per minute for between approximately 10 to 15 minutes. During the centrifugation, the insoluble portion of the homogenate is collected at the bottom of the centrifugation tube in the form of a compact plug. After the centrifugation is completed, the supernatant is then decanted and lyophilized. For most preparations of homogenized fish, a second extraction is performed by adding another small volume of distilled water to the plug, thoroughly resuspending the plug in the distilled water, and then incubating the mixture for an additional 60 minutes. The mixture is then centrifuged as in the first extraction and the resulting supernatant decanted and lyophilized. The average protein content of the fish homogenate supernatants is between approximately 25% and 55% protein by dry weight.

The lyophilized fish homogenate supernatant can be stored for several weeks to several months. For use as a gustatory additive, the lyophilized fish homogenate supernatant is then mixed with a water insoluble matrix such as petrolatum cream (Amojell petrolatum cream, Amoco Oil Co., Chicago, Ill.). The concentration of lyophilized fish homogenate by weight in the petroleum cream is between approximately 20% and 40% by weight. The lyophilied fish homogenate supernatant/petrolatum cream mixture is applied topically to a fish lure such as a vinyl simulated worm.

EXAMPLE 2

In a second embodiment of the improved artificial lure according to the present invention, a gustatory additive is prepared using an animal protein hydrolysate. For example, BBL nutrient broth #11479 (BBL, Cockeysville, Md. 21030) was found to be particularly effective as a gustatory additive to coating lures. The BBL nutrient broth is a gelatin hydrolysate made by digesting gelatin with a mixture of pancreatic enzymes including but not limited to trypsin, chymotrypsin and carboxypeptidase A and B. The gelatin hydrolysate is a mixture of small peptides and amino acids. In addition to the gelatin hydrolysate, the BBL nutrient broth also contains beef extract. Beef extract is an aqueous extract of beef muscle. The preferred nutrient formulation is 5 parts of gelatin hydrolysate to 3 parts beef extract.

The BBL nutrient broth in the form of a dry powder is mixed with petrolatum cream at a concentration of between 15% and 40% by weight. The nutrient broth gustatory additive in petrolatum cream is then applied topically to a fishing lure such as a vinyl artificial worm.

EXAMPLE 3

In this example, the gustatory additives are prepared as in examples 1 and 2 except for the last step of mixing the gustatory additives in a water insoluble solvent. Instead of using petrolatum cream as the insoluble solvent, the powdered gustatory additives are mixed with 2.5% vinyl in tetrahydrofuran (THF) (Fisher Scientific Co., Pittsburgh, Pa.). The slurry of gustatory additive and THF is then sprayed or painted onto a vinyl artificial lure with a paint brush. Alternatively, the vinyl artificial lures are dipped in the slurry of gustatory additive and THF.

EXAMPLE 4

The gustatory additive of the present invention is tested by determining how long a bass will hold a vinyl plug in its mouth and whether the bass will swallow the vinyl plug. The lures treated as in examples 1–3 above are compared to the length of time untreated lures are held in the fish's mouth. In addition, the percentage of presentations where the bass swallows the vinyl plug is measured.

Largemouth bass (*Micropterus salmoides*) are obtained from Alice Edward's fish farm, Roper, N.C. and Zett's Tri-State Hatchery, Inwood, W. Va. The bass are between one and two years old and range in length from 3 to 7 inches. Initially, bass are held in 20 to 100 gallon aquaria in groups of eight to ten. During the conditioning interval, the bass are confined individually or in groups of 3 fish. After conditioning, the bass are confined individually in 15 to 20 gallon aquaria containing filtered well water. Bass are maintained on a diet of fresh and frozen bait fish. Water temperature of the aquaria range from 19° to 24° C. A 12 hour light and dark cycle was maintained throughout the testing period.

The bass are conditioned to strike inanimate objects as they are dropped into the tank. Initially, the bass eat only live food. After the bass become accustomed to the morning and afternoon feeding schedule (generally about four days), they are presented with fresh dead fish until they will eat this food. After a short period of eating whole dead fish, the bass are given pieces of fish. When pieces are eaten regularly, the bass are presented sections of vinyl that are similar in size to the pieces of dead fish. The vinyl pellets are black or pink in color, 2 mm in diameter. Pellets are cut from uniform sheets of vinyl with a hand cork borer. Bass conditioned to eat fish pieces sometimes eat the first several vinyl pellets. Vinyl pellets are offered daily in conjunction with fish pieces until the bass strike but reject while striking and consuming fish. The entire conditioning interval required two days to two weeks depending upon the fish.

The handling assay is a laboratory test that uses fish responses to determine the effect the gustatory additives. Handling time assays are initiated by testing the response of bass to fish pieces and to vinyl. If the bass eat fish pieces and strike and reject plain vinyl, the bass is included in that particular experiment. Tests are conducted at least two hours apart and only two tests are conducted per day. Experimental pellets and control vinyl pellets are offered to each tank of fish until three pellets of each sample have been struck. The time interval (handling time) in seconds is recorded for each vinyl plug that is struck. Thirty seconds is the upper time limit because most items handled for 30 seconds are swallowed by the fish. A piece of fish is offered to the bass after each test presentation.

Assays are used to measure chemical formulations for their ability to increase the handling time of treated vinyl over untreated vinyl. These tests are called zero minute tests because the treated vinyl and control vinyl pieces are struck immediately and thus not exposed to leaching of compounds. Loss of activity due to leaching is tested by rinsing pellets in running tap water (1 liter/minute) for 30 minutes prior to testing.

EXAMPLE 5

One group of vinyl pellets is coated with the gustatory additive of the present invention (fish homogenate supernatant) from example 1. A second group of identical vinyl pellets (control group) is not treated with the gustatory additive of the present invention. The pellets are presented to the bass as described above in Example 4. To determine if the gustatory additive of the present invention is washed off the vinyl, the treated pellets are rinsed in running water for 30 minutes and then presented to the bass. The results of this example are shown in FIG. 1 and FIG. 2. N is the number of experiments performed for each experimental point.

As shown in FIG. 1, the unwashed (zero minute), untreated vinyl pellets (black column) are only held 1.9 seconds while the vinyl pellets treated with gustatory additive of the present invention from example 1 (cross-hatched column) are held at least 30 seconds.

Gustatory additive treated vinyl pellets and the control vinyl pellets are washed for 30 minutes in running water and then presented to the fish. The washed control pellets are held about 7.2 seconds. The washed gustatory additive treated vinyl pellets show no decrease in activity when compared to the unwashed pellets. The gustatory additive treated vinyl pellets are held in the fish's mouth at least 30 seconds.

The percentage of vinyl pellets that are eaten when presented to the fish is shown in FIG. 2. None of the unwashed (zero minutes), untreated vinyl pellets (black column) are eaten by the fish while 100% of the vinyl pellets treated with the gustatory additive of the present invention from example 1 (cross-hatched column) are eaten.

Gustatory additive treated vinyl pellets and the control vinyl pellets are washed for 30 minutes in running water and then presented to the fish. 13.3% of the washed control pellets are eaten, as shown in FIG. 2. The washed, gustatory additive treated vinyl pellets showed no decrease in activity when compared to the unwashed treated pellets. Surprisingly, 100% of the washed fish supernatant treated vinyl pellets are eaten by the fish.

EXAMPLE 6

Figure 4:
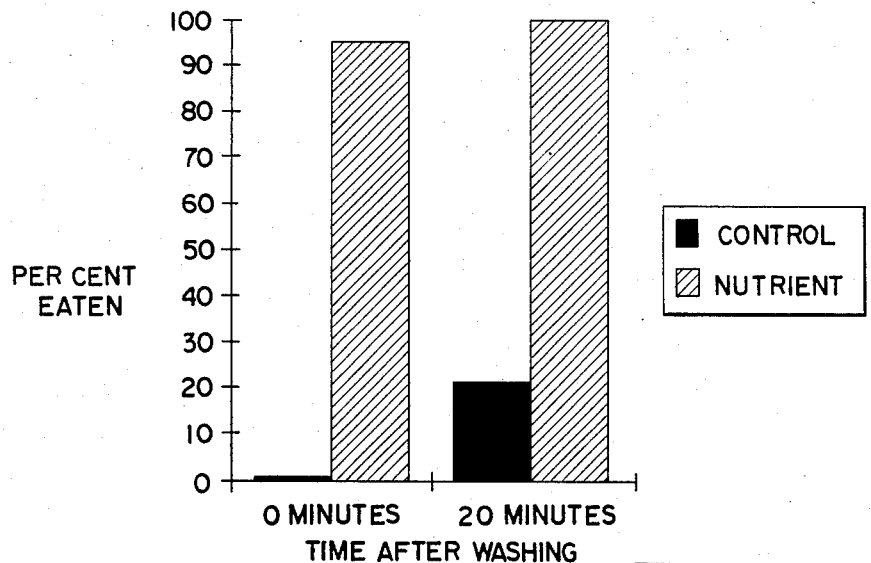
FIG. 4 is a graph comparing the ingestion by fish or lures treated with a second embodiment of the present invention and untreated lures.

One group of vinyl pellets are coated with the gustatory additive of the present invention from example 2 (nutrient broth and petrolatum cream). A second group of identical vinyl pellets (control group) is not treated with the gustatory additive. The pellets are presented to the bass as described above in example 4. To determine if the gustatory additive of the present invention is washed off the vinyl, the treated pellets are rinsed in running water for 30 minutes and then presented to the bass. The results of this example are shown in FIG. 3 and FIG. 4. N is the number of experiments performed for each experimental point.

As shown in FIG. 3, the unwashed (zero minutes), untreated vinyl pellets (black column) are only held 2.1 seconds while the vinyl pellets treated with gustatory additive of the present invention from example 2 (cross-hatched column) is held at least 30 seconds.

Gustatory additive treated vinyl pellets and the control vinyl pellets are washed for 30 minutes in running water and then presented to the fish. The washed control pellets are held about 7.5 seconds. The washed, gustatory additive treated vinyl pellets showed no decrease in activity when compared to the unwashed pellets. The washed, gustatory additive treated vinyl pellets are held in the fish's mouth at least 30 seconds or are swallowed.

The percentage of vinyl pellets that are eaten when presented to the fish is shown in FIG. 3. None of the unwashed (zero minutes), untreated vinyl pellets (black column) are eaten by the fish while 100% of the vinyl pellets treated with the gustatory additive of the present invention from example 2 (cross-hatched column) are eaten. Gustatory additive treated vinyl pellets and the control vinyl pellets are washed for 30 minutes in running water and then presented to the fish. 20.8% of the washed control pellets are eaten. The washed, gustatory additive treated vinyl pellets show no decrease in activity when compared to the unwashed treated pellets. Surprisingly, 100% of the washed fish supernatant treated vinyl pellets were eaten by the fish.

EXAMPLE 7

The gustatory additive of the present invention is found to be unexpectedly and surprisingly superior to commercially available fishing formulations in the prior art. The gustatory additive of the present invention is held by the fish in its mouth far longer than the prior art fishing formulations are held when tested according to the protocol outlined in example 4.

A series of tests are conducted to determine if other commercial formulations were effective in increasing handling time. The prior art fishing formulations tested are as follows:
  Liquid Products
  Jelly Worm Oil (Mann Bait Company)
  Fish Formula II (Keeper Bait Co.)
  Rippler Worms (Producto Lure Co.)
  Solid Products
  Fish Formula Crawfish (Keeper Bait Co.)
  Chummin Minnow (Bass Buster)
  Gator Bait (Scientific Bait Co.)
  Uncle Josh Pork Rind (Uncle Josh Bait Co.)
  Culprit Salt Worms (Classic Mfg. Co.)

Several of the commercial prior art formulations are sold as solid products. These formulations are Rippler Worms, Culprit Salt Worms, Chummin minnow, Gator Bait and Uncle Josh. For these products, pieces of the solid product are cut out that are the same size as the vinyl plugs used to test liquid formulations. The other commercial prior art formulations are liquid in form. Vinyl plugs are coated with these products as described in example 4.

Figure 5:
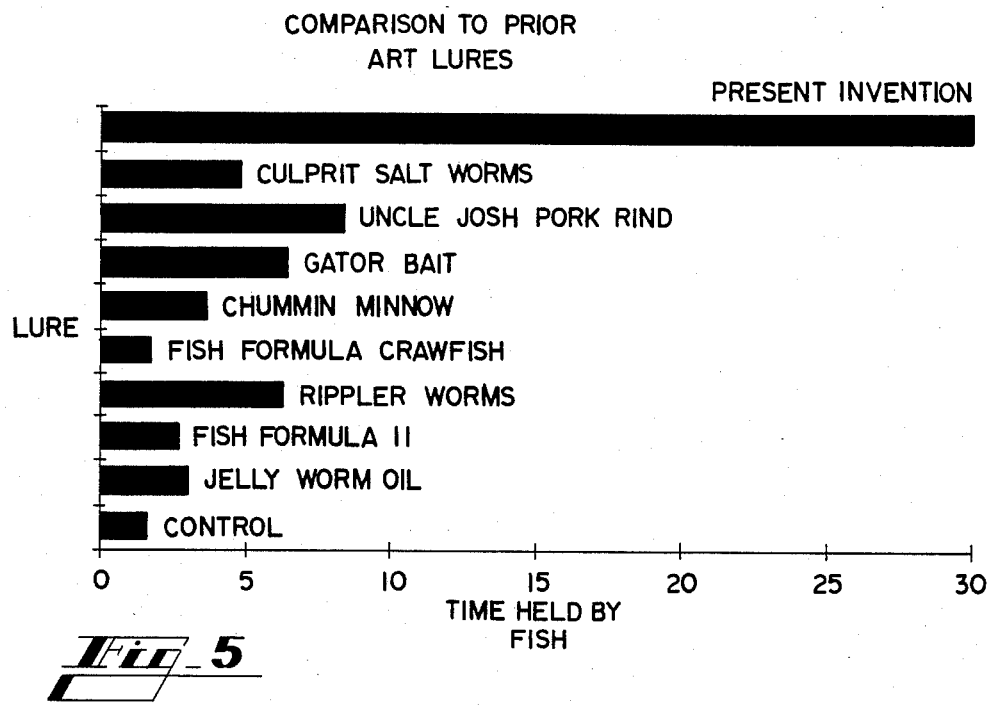
FIG. 5 is a graph comparing the time a lure coated with the gustatory additive of the present invention is held by a fish to lures coated with commercially available fish attractants.

Referring now to FIG. 5, the prior art fishing lures and fishing formulations are compared to the gustatory additive of the present invention according to the protocol of example 4. FIG. 5 shows that fish do not hold the the prior art fishing formulations nearly as long as vinyl plugs coated with the gustatory additive of the present invention. The gustatory additive of the present invention is held at least 30 seconds. The nearest handling time to the the gustatory additive of the present invention is measured with the Uncle Josh Pork Rind, which is held only 10 seconds.

Figure 6:
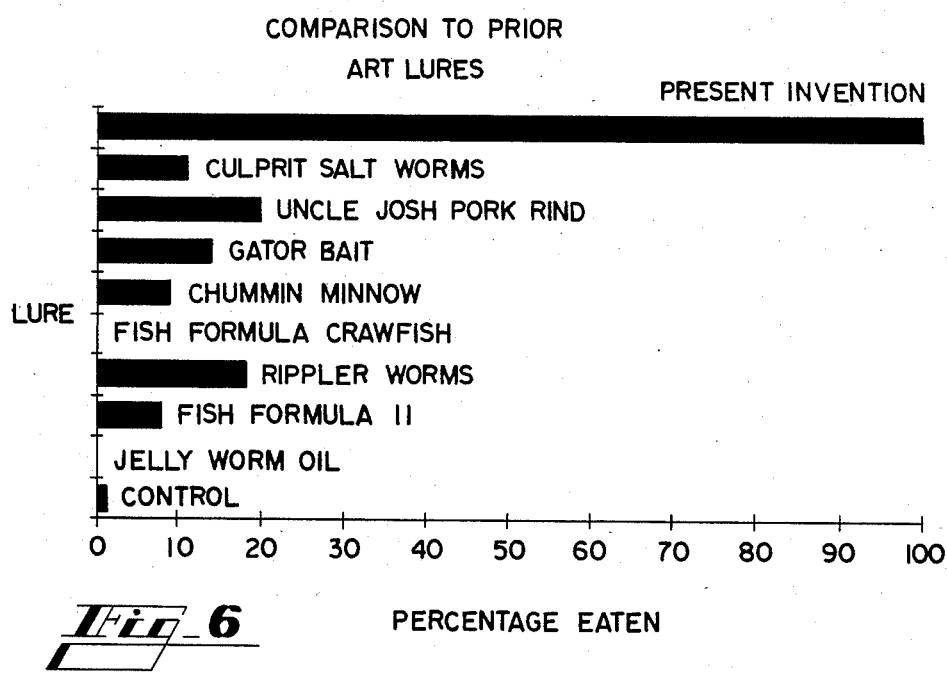
FIG. 6 is a graph comparing the ingestion by fish of lures coated with the gustatory additive of the present invention to lures coated with commercially available fish attractants.

Referring to FIG. 6, the percentage of presentations that were eaten by the fish are shown. The vinyl pellets coated with the gustatory additive of the present invention is eaten 100% of the time. All of the prior art commercial fishing lures and formulations are either not eaten at all or only a low percentage of presentations to the fish are eaten.

EXAMPLE 8

Several of the prior art commercial lures that are sold as solid products are compared to the improved artificial fishing lure of the present invention for handling time by the fish and also for consumption of the vinyl pellets. To separate chemical from texture effects, the prior art lures are extracted with water. The water is then removed by lyophiliation and the extracted chemical is tested on vinyl as previously described. The results of these tests are shown in FIG. 7 and 8.

As shown in FIG. 7, the amount of time the fish holds the control vinyl plug is about 1.6 seconds. The aqueous extracts from the Rippler, Culprit Chummin Minnow does not significantly improved handling time of the vinyl plug. Aqueous extracts of Gator Bait and Uncle Josh does improve handling time over the untreated control vinyl plug. However, the plug coated with the gustatory additive of the present invention described in Example 2 is held by the fish for at least 30 seconds.

Referring now to FIG. 8, the percentage of the vinyl pellets that are eaten by the fish is shown. None of the untreated control pellets, nor vinyl plugs treated with aqueous extracts of Chummin, Rippler or Gator Bait, are eaten by the fish. Approximately five percent of the vinyl plugs coated with the Culprit aqueous extract and 13 percent of the vinyl plugs coated with the Uncle Josh aqueous extract are eaten. At the same time, 100% of the plugs coated with the gustatory additive of the present invention described in Example 2 are eaten by the fish.

EXAMPLE 9

Two embodiments of the gustatory additive are applied to vinyl artificial fishing worms. These two embodiments are the vinyl solution incorporation fish supernatant of example 3 and the petrolatum incorporated fish supernatant of example 1. These gustatory additive treated fishing lures are used in field tests in which the treated fishing worms are compared to untreated fishing worms in three categores.

The first category in which the treated fishing lure was compared to the untreated fishing lure was the number of fish strikes on the worms. Significantly more strikes by the fish were made on the treated worms than on the untreated lures. Also, more fish were caught using the gustatory additive treated lures than with untreated worms. Statistical analysis also revealed that the total level of activity with the treated lures was approximately double that for the untreated lure.

While this invention has been described in detail with particular reference to preferred embodiments thereof, it will be understood that variations and modifications can be effected within the spirit and scope of the invention as described hereinbefore and as defined in the appended claims.

We claim:

1. A gustatory additive for fishing lures comprising a water insoluble matrix admixed with a gelatin hydrolysate and beef extract, said gelatin hydrolysate made by a pancreatic digestion of gelatin, said water insoluble matrix being selected from the group consisting of petrolatum cream and a mixture of vinyl and tetrahydrofuran.

2. The gustatory additive of claim 1 wherein said gelatin hydrolysate approximately 20 and 40% by weight of the gustatory additive.

3. The gustatory additive of claim 1 wherein said unsoluble matrix comprises a petrolatum cream.

4. The gustatory additive of claim 1 wherein said vinyl is approximately 2.5% of said mixture of vinyl and tetrahydrofuran.

5. An improved fish bait comprising a lure and a gustatory additive in a water insoluble matrix applied to the surface of said lure, said gustatory additive comprising a gelatin hydrolysate made by pancreatic digestion of gelatin and beef extract, said water insoluble matrix being selected from the group consisting of petrolatum cream and a mixture of vinyl and tetrahydrofuran.

6. The improved fish bait of claim 5 wherein said gelatin hydrolysate is between approximately 20% and 40% by weight of said gustatory additive.

7. The improved fish bait of claim 5 wherein said insoluble matrix comprises a petrolatum cream.

8. The improved fish bait of claim 5 wherein said vinyl is approximately 2.5% of said mixture of vinyl and tetrahydrofuran.

9. The improved fish bait of claim 5 wherein said gustatory additive is distributed throughout said lure.

10. A method of making an improved fish bait comprising the steps of:
(a) preparing a gustatory additive comprising an admixture of a water insoluble matrix and beef extract, said water insoluble matrix being selected from the group consisting of petrolatum cream and a mixture of vinyl and tetrahydrofuran; and
(b) applying said admixture of water insoluble matrix and beef extract to the surface of a fishing lure.

* * * * *